(12) United States Patent
Forbert et al.

(10) Patent No.: US 9,527,037 B2
(45) Date of Patent: Dec. 27, 2016

(54) PREPARATION OF AN AMINE BASED SOLVENT CONTAMINATED BY THE INTRODUCTION OF SULFUR OXIDES

(75) Inventors: Rainald Forbert, Moosburg (DE); Stefan Hauke, Einhausen (DE); Ralph Joh, Seligenstadt (DE); Frank Olschewski, Frankfurt (DE); Rüdiger Schneider, Eppstein (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 671 days.

(21) Appl. No.: 13/883,099

(22) PCT Filed: Nov. 8, 2011

(86) PCT No.: PCT/EP2011/069593
§ 371 (c)(1),
(2), (4) Date: May 2, 2013

(87) PCT Pub. No.: WO2012/062724
PCT Pub. Date: May 18, 2012

(65) Prior Publication Data
US 2013/0214202 A1    Aug. 22, 2013

(30) Foreign Application Priority Data
Nov. 10, 2010  (DE) .......... 10 2010 043 689

(51) Int. Cl.
*B01D 9/00*       (2006.01)
*B01D 53/50*      (2006.01)
(Continued)

(52) U.S. Cl.
CPC ............. *B01D 53/96* (2013.01); *B01D 9/0013* (2013.01); *B01D 53/1425* (2013.01);
(Continued)

(58) Field of Classification Search
CPC ..... B01D 53/50; B01D 53/501; B01D 53/502; B01D 53/507; B01D 53/60; B01D 53/96; B01D 53/1425; B01D 53/1475; B01D 37/00; B01D 2251/10; B01D 2251/104; B01D 2251/106; B01D 2251/306; B01D 2251/604; B01D 2251/606; B01D 2252/204; B01D 2252/20406; B01D 2252/20408; B01D 2252/20478; B01D 2252/20489; B01D 2252/20484; B01D 2257/50; B01D 2257/504; B01D 9/00; B01D 9/0013; B01D 9/0059; B01D 9/0086; B01D 9/02; C01B 17/56; C01B 17/60; C01B 21/082; C01B 21/087; C01B 21/14; C01B 21/1409; C01B 21/1481; C01B 17/021; C01B 17/90; Y02C 10/06
(Continued)

(56) References Cited

U.S. PATENT DOCUMENTS 3,413,086 A *  11/1968  Every et al. .................. 423/552
4,341,746 A *   7/1982  Sarsten ............. B01D 53/1425
                                                       423/228
(Continued)

FOREIGN PATENT DOCUMENTS

DE    2702583 A1    7/1978
JP    H0240204 A    2/1990
(Continued)

OTHER PUBLICATIONS

China Society for Environmental "Academic Annual Conference Proceedings of China Society for Environmental Sciences" 2010, vol. 4; pp. 3411-3412; China Environmental Science Press; 2010.

*Primary Examiner* — Joseph Drodge
*Assistant Examiner* — Nader Hossaini

(57) ABSTRACT

A method for processing an amine-based solvent contaminated by the introduction of sulfur oxides is provided. A
(Continued)

potassium compound is introduced into a contaminated solvent, and the contaminated solvent is cooled so that a solubility of a potassium sulfate becomes less than a specified concentration of potassium sulfate. Further, an oxidizing agent is introduced into the contaminated solvent so that a potassium sulfite is oxidized to potassium sulfate. The potassium sulfate is filtered out, wherein a prepared solvent is formed. Further, a device for processing an amine-based, sulfur oxide-contaminated solvent is provided.

11 Claims, 2 Drawing Sheets

(51) Int. Cl.
<table>
<tr><td>B01D 53/60</td><td>(2006.01)</td></tr>
<tr><td>B01D 53/96</td><td>(2006.01)</td></tr>
<tr><td>C01B 17/56</td><td>(2006.01)</td></tr>
<tr><td>B01D 53/14</td><td>(2006.01)</td></tr>
</table>

(52) U.S. Cl.
CPC .......... *C01B 17/56* (2013.01); *B01D 53/1475* (2013.01); *B01D 2009/0086* (2013.01); *B01D 2251/104* (2013.01); *B01D 2251/106* (2013.01); *B01D 2251/306* (2013.01); *B01D 2251/604* (2013.01); *B01D 2251/606* (2013.01); *B01D 2252/20484* (2013.01); *B01D 2252/20494* (2013.01); *B01D 2257/504* (2013.01); *Y02C 10/06* (2013.01)

(58) Field of Classification Search
USPC .......... 95/187, 235, 236; 210/758, 759, 760, 210/774, 806; 423/242.7, 243.01, 243.11, 423/351, 364, 371, 406, 413; 252/189, 252/190, 364
See application file for complete search history.

(56) References Cited

U.S. PATENT DOCUMENTS

<table>
<tr><td>4,389,383 A *</td><td>6/1983</td><td>Sokolik, Jr.</td><td>B01D 53/1425<br>423/242.7</td></tr>
<tr><td>4,425,313 A *</td><td>1/1984</td><td>Cooper</td><td>B01D 53/501<br>423/235</td></tr>
<tr><td>4,465,614 A *</td><td>8/1984</td><td>Trentham</td><td>B01D 53/1493<br>252/184</td></tr>
<tr><td>4,500,500 A</td><td>2/1985</td><td>Drapeau</td><td></td></tr>
<tr><td>4,533,440 A</td><td>8/1985</td><td>Kim</td><td></td></tr>
<tr><td>4,976,935 A *</td><td>12/1990</td><td>Lynn</td><td>B01D 53/1468<br>423/222</td></tr>
<tr><td>5,753,012 A</td><td>5/1998</td><td>Lang</td><td></td></tr>
<tr><td>5,912,387 A</td><td>6/1999</td><td>Rooney</td><td></td></tr>
<tr><td>6,010,664 A</td><td>1/2000</td><td>Bhat</td><td></td></tr>
<tr><td>2004/0253159 A1</td><td>12/2004</td><td>Hakka</td><td></td></tr>
<tr><td>2006/0239877 A1</td><td>10/2006</td><td>Ehrnschwender</td><td></td></tr>
<tr><td>2008/0159937 A1*</td><td>7/2008</td><td>Ouimet</td><td>B01D 53/1475<br>423/230</td></tr>
<tr><td>2008/0250715 A1*</td><td>10/2008</td><td>Cooper</td><td>B01D 47/06<br>48/197 FM</td></tr>
<tr><td>2010/0092359 A1*</td><td>4/2010</td><td>Svendsen et al.</td><td>423/230</td></tr>
<tr><td>2013/0139695 A1*</td><td>6/2013</td><td>Chang et al.</td><td>96/235</td></tr>
<tr><td>2013/0269525 A1*</td><td>10/2013</td><td>Alix</td><td>B01D 53/1425<br>95/159</td></tr>
</table>

FOREIGN PATENT DOCUMENTS

<table>
<tr><td>JP</td><td>H06210129 A</td><td>8/1994</td></tr>
<tr><td>JP</td><td>H0889756 A</td><td>4/1996</td></tr>
<tr><td>SU</td><td>795448 A3</td><td>1/1981</td></tr>
</table>

* cited by examiner

PREPARATION OF AN AMINE BASED SOLVENT CONTAMINATED BY THE INTRODUCTION OF SULFUR OXIDES

CROSS REFERENCE TO RELATED APPLICATIONS

This application is the US National Stage of International Application No. PCT/EP2011/069593 filed Nov. 8, 2011, and claims benefit thereof, the entire content of which is hereby incorporated by reference. The International Application claims priority to the German Application No. 10 2010 043 689.5 DE filed Nov. 10, 2010, the entire contents of which is hereby incorporated by reference.

FIELD OF INVENTION

A method for processing an amine-based solvent contaminated by the introduction of sulfur oxides, and a device for processing an amine-based, sulfur oxide-contaminated solvent are provided.

BACKGROUND OF INVENTION

In the case of fossil-fuel-fired power plants for generating electricity, a carbon dioxide-containing flue gas is formed through the combustion of a fossil fuel. In order to prevent or decrease carbon dioxide emissions, carbon dioxide must be separated from the flue gases. In general, various methods are known for separating carbon dioxide from a gas mixture. In particular, the absorption-desorption method is usually employed for separating carbon dioxide from a flue gas after a combustion process. On an industrial scale, carbon dioxide is washed out of the flue gas using an absorbent.

The usual chemical absorbents, for example monoethanolamine (MEA), display good selectivity and a high capacity for carbon dioxide $CO_2$. However, amine solutions as detergents also bind, irreversibly, acidic minor constituents of flue gas such as nitrogen dioxide $NO_2$ and sulfur dioxide $SO_2$ or sulfur trioxide $SO_3$ in the form of sulfite and sulfate and thus increasingly impair the effectiveness of the detergent in the course of the process. Formation of sulfite and sulfate takes place, under the alkaline conditions prevailing in amine-based solvents, according to the following equations:

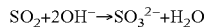

$SO_2 + 2OH^- \rightarrow SO_3^{2-} + H_2O$

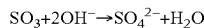

$SO_3 + 2OH^- \rightarrow SO_4^{2-} + H_2O$

To combat the problem of accumulation of sulfite and sulfate, in the case of amine solutions there is the possibility of processing by distillation. In this, the amine solution is heated, so that the highly volatile amines evaporate and are recovered by condensation and so are separated from the high-boiling contaminants.

The notable vapor pressure of the dissolved amines can admittedly be utilized on the one hand for distillation-based purification, on the other hand, during the actual purification process, through contact with the hot flue gas, amines are discharged in small amounts with the purified flue gas into the environment, which can lead to undesirable air pollution. Moreover, distillation-based purification techniques require a high energy expenditure, and per mole of separated sulfite or sulfate, two moles of the active substance remain in the residue, which must be further processed or disposed of.

Therefore, in this respect salts of amino acids for example are particularly suitable for scrubbing $CO_2$ flue gas, as solutions of salts of amino acids do not have a measurable vapor pressure and therefore cannot be discharged with the flue gas. However, for this reason distillation-based processing is also not possible with solutions of salts of amino acids. To prevent blocking of the salts of amino acids by the acidic flue gas constituents, therefore very expensive fine purification of flue gas (polishing) is required, in order to remove sulfur oxides $SO_x$ as completely as possible from the flue gas. These techniques are very cost-intensive with respect to capital costs and operating costs.

SUMMARY OF INVENTION

It is an object to provide a method for processing an amine-based solvent contaminated by the introduction of sulfur oxides, in which on the one hand the detergent substances largely remain completely in solution, and which supplies a solvent that is largely free from sulfite and sulfate, with a greatly reduced energy consumption in comparison with distillation-based purification techniques, and minimal residues. Further, it is another object to provide a device for performing the method.

The objects are achieved by a method and a device with the features as claimed in the independent claims. In this, first a potassium compound is introduced into the contaminated solvent, and the contaminated solvent is cooled to a temperature T, so that the solubility of the potassium sulfate becomes less than the specified concentration of potassium sulfate. The potassium sulfate is filtered off, with formation of a prepared solvent. Further, an oxidizing agent is introduced into the contaminated solvent so that sulfite is oxidized to sulfate.

The method can be used in particular for processing a solvent that is mainly contaminated by the introduction of sulfur oxides, which is used for scrubbing $CO_2$ flue gas in a carbon dioxide-separating process. These separating processes for carbon dioxide $CO_2$ represent an integral component of flue gas purification for fossil fuel-fired power plants.

The invention is based in particular on the idea of using selective crystallization for processing a solvent that is contaminated with sulfite and sulfate.

In the method according to the invention, the sulfate is precipitated as potassium sulfate by cooling the solvent and adding a potassium compound, bringing the concentration of potassium sulfate to values above the solubility of potassium sulfate. In a subsequent or parallel step, the potassium sulfate is filtered off, so that a prepared solvent is formed.

The invention makes use of the low solubility of potassium sulfate in amine-based solvents, which makes it possible to separate the potassium sulfate by lowering the temperature. Preferably, the contaminated solvent is cooled or adjusted to a temperature T between 5° C. and 45° C.

In addition to sulfate, however, the solvent is also contaminated with sulfite, which in comparison with sulfate has very good solubility and does not crystallize out simply by lowering the temperature in a desired range. Therefore, according to the claimed method, an oxidizing agent is introduced into the contaminated solvent, so that the sulfite is oxidized to sulfate.

Through introduction of the potassium compound and of the oxidizing agent, distribution gradients and local excess concentrations can arise, which owing to an excessive concentration of the potassium compound lead to precipitations or damage of the solvent through an excessive concentration of oxidizing agent. Therefore in an advantageous embodiment the oxidizing agent and the potassium compound are mixed together before being introduced into the contaminated solvent. By mixing prior to introduction into the solvent, rapid uniform distribution can be achieved.

Advantageously, hydrogen peroxide or ozone is used as oxidizing agent. Basically, oxygen can also be used. However, hydrogen peroxide and ozone have the advantage that they possess sufficient activity or a sufficient oxidation potential, to oxidize sulfite without damaging the solvent.

A special embodiment of the method envisages that the amount of potassium compound supplied is equimolar to the amount of crystallized potassium sulfate. In this way, sufficient potassium for the crystallization process is always supplied. Conversely, it may also be of advantage to add more than the stoichiometric amount of potassium compound, to create a buffer for the crystallization process.

In an advantageous embodiment of the method, heat exchange is provided between the prepared solvent and the contaminated solvent, so that the contaminated solvent is cooled by the prepared solvent. This makes heat recovery possible.

The method can be used independently, with the contaminated solvent being obtained from tanks and the prepared solvent also being provided in tanks. Advantageously, however, the method can also be integrated in a power station process and can be connected to a carbon dioxide-separating process, so that the contaminated solvent is taken directly from the circuit of the carbon dioxide-separating process.

The method is suitable advantageously for the processing of solutions of salts of amino acids as well as of amine solutions. As distillation-based processing is not possible for solutions of salts of amino acids, the method offers, for the first time, the possibility of an effective and energetically justifiable solution.

Along with the energetic advantages, there are further advantages for the processing of amine solutions, especially in polishing. Using distillation, only a proportion of the amines can be separated from the solution and therefore from the contaminants. A considerable proportion remains in the bottoms solution. With the method according to the invention, this bottoms solution can be further processed, so that a high proportion of the amines can be recovered.

BRIEF DESCRIPTION OF THE DRAWINGS

Examples of carrying out the invention are explained in more detail below, referring to the appended schematic drawings, wherein.

DETAILED DESCRIPTION OF INVENTION

Figure 1:
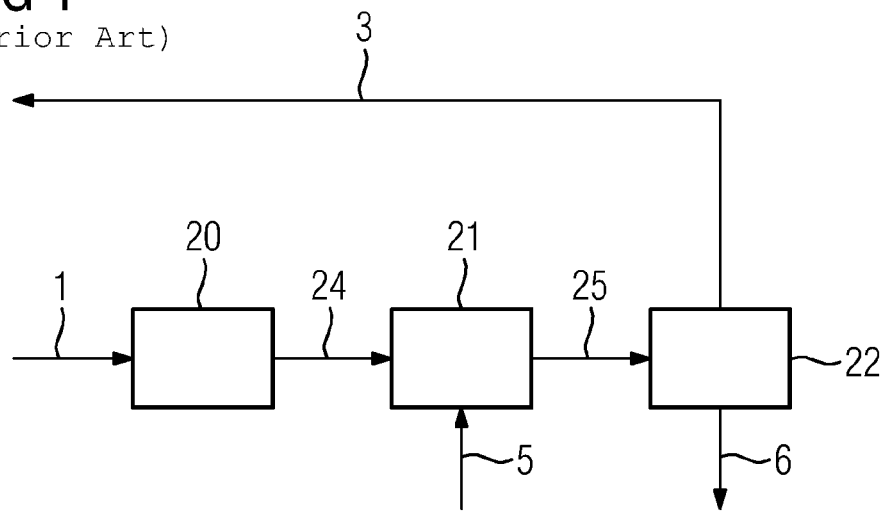
FIG. 1 shows a method of processing a contaminated alkaline potassium-amino acid salt solution according to prior art.

FIG. 1 shows a method according to prior art based on three successive process steps.

In a first process step 20, a potassium-amino acid salt solution 1, contaminated with sulfite and sulfate, is fed in and cooled. As a result of cooling, the solubility of potassium sulfate drops below the specified potassium sulfate concentration, so that potassium sulfate crystallizes out, and a first suspension 24 is formed from contaminated solvent 1 and potassium sulfate, and is sent to a second process step 21.

In the second process step 21, a potassium compound 5 is introduced into the contaminated solvent 1, compensating for the loss of potassium from the solvent caused by potassium sulfate crystallization. The suspension 25 formed in the second process step is fed to a third process step 22.

In the third process step 22, the suspension 25 is filtered, wherein potassium sulfate 6 is separated, and a prepared solvent 3 is formed.

Figure 2:
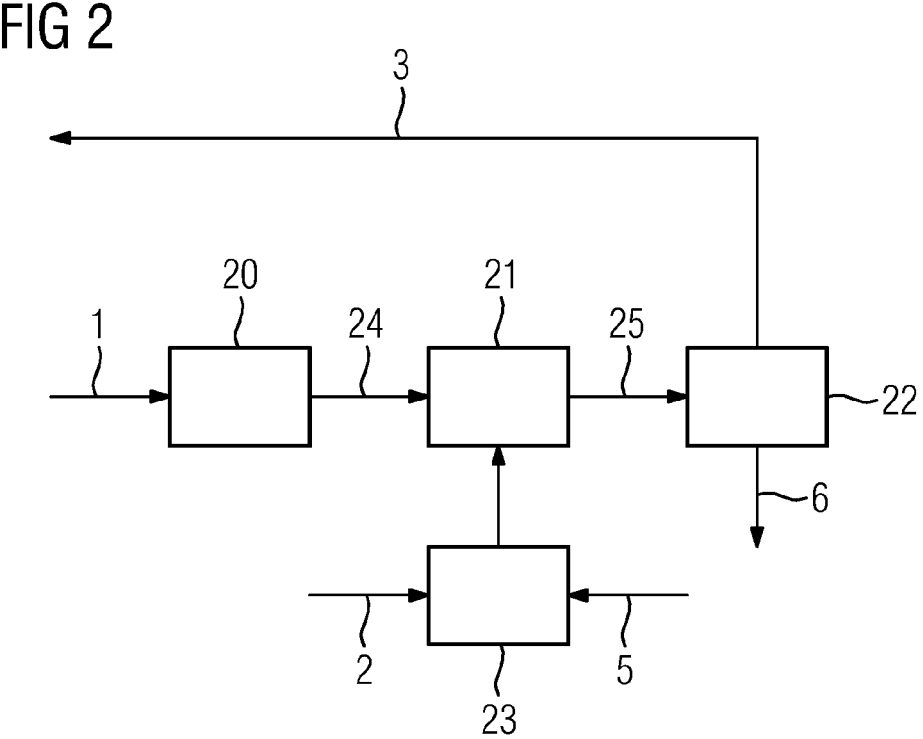
FIG. 2 shows an embodiment of the claimed method with an additional mixing process.

FIG. 2 shows an embodiment of the claimed method. In an extension to FIG. 1, an oxidizing agent 2 is fed to the second process step 21, along with the potassium compound 5. For this, a mixing process 23 is provided, in which the oxidizing agent 2 and the potassium compound 5 are introduced and mixed, and then introduced as a mixture into the second process step 21.

Figure 3:
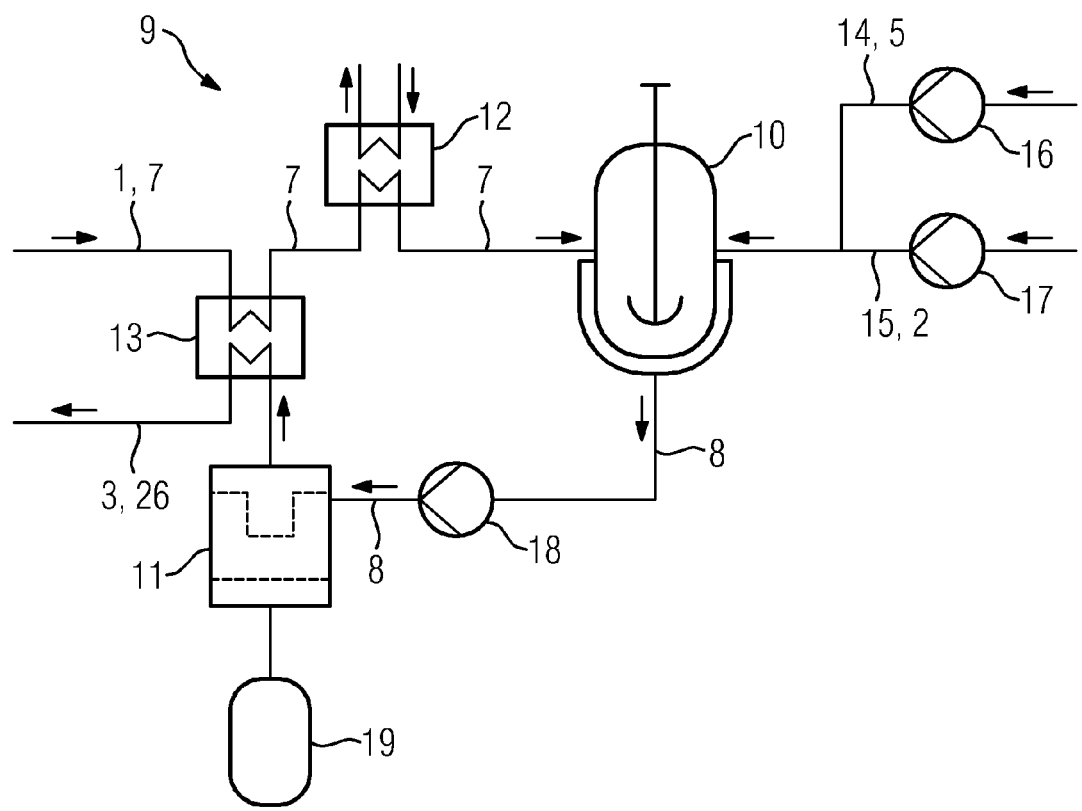
FIG. 3 shows a device for processing a contaminated absorbent for carbon dioxide.

FIG. 3 shows a device 9 for processing a contaminated solvent 1 for carbon dioxide. The device 9 essentially comprises a crystallization reactor 10, a filter 11, a condenser 12, and a heat exchanger 13.

The crystallization reactor 10 has a feed line 7 for a contaminated solvent 1. The heat exchanger 13 and the condenser 12 are installed in the feed line 7. In addition, a feed line 14 for supplying a potassium compound 5 and a feed line 15 for supplying an oxidizing agent 2 are connected to the crystallization reactor 10. A first variable-delivery pump 16 is installed in feed line 14 and a second variable-delivery pump 17 is installed in feed line 15. Feed line 15 is optional.

For discharge, the crystallization reactor 10 is connected via a suspension line 8 to the filter 11. A feed pump 18 is included in the suspension line 8.

For discharging a crystalline solid, after the filter there is a container 19. For discharging a prepared solvent 3, a line 26, which is installed in the heat exchanger 13, is connected to the filter 11. Thus, the heat exchanger 13 is able to transfer heat from the contaminated solvent 1 to the prepared solvent 3.

The heat exchanger 13 is optional, and is advantageous in particular with direct integration of the device 9 in a carbon dioxide-separating device.

Although the invention has been illustrated and described in detail by the preferred example, the invention is not limited by the examples that have been disclosed, and other variations can be derived therefrom by a person skilled in the art, while remaining within the scope of protection of the invention.

The invention claimed is:

1. A method for processing an amine-based solvent contaminated by the introduction of sulfur oxides, comprising:
    cooling the contaminated solvent so that potassium sulfate crystallizes out of the contaminated solvent;
    introducing a potassium compound into a contaminated solvent, wherein the step of introducing the potassium compound in the contaminated solvent compensates for the loss of potassium from the contaminated solvent caused by potassium sulfate crystallization;
    introducing an oxidizing agent into the contaminated solvent so that a potassium sulfite is oxidized to potassium sulfate, and
    filtering out the potassium sulfate, wherein a prepared solvent is formed.

2. The method as claimed in claim 1, wherein the oxidizing agent and the potassium compound are mixed together before they are introduced into the contaminated solvent.

3. The method as claimed in claim 1, wherein the oxidizing agent comprises hydrogen peroxide or ozone.

4. The method as claimed in claim 1, wherein an amount of the potassium compound supplied is equimolar to an amount of crystallized potassium sulfate.

5. The method as claimed in claim 1, wherein a temperature T of the contaminated solvent after cooling is between 5° C. and 45° C.

6. The method as claimed in claim 1, wherein a heat exchange is provided between the prepared solvent and the contaminated solvent so that the contaminated solvent is cooled by the prepared solvent.

7. The method as claimed in claim 1, wherein the contaminated solvent is obtained from a carbon dioxide-separating process of a fossil-fuel-fired power station process.

8. The method as claimed in claim 7, wherein the contaminated solvent is processed batch-wise from the carbon dioxide-separating process.

9. The method as claimed in claim 1, wherein the contaminated solvent is the amino based solvent, wherein the amino based solvent is a potassium-amino acid solution.

10. The method as claimed in claim 1, wherein the contaminated solvent comprises one or more amines.

11. The method as claimed in claim 1, wherein the potassium compound comprises potassium hydroxide KOH, potassium hydrogen carbonate or potassium carbonate.

* * * * *